A. E. OSBORN
Oct. 22, 1929. PAPER PORTFOLIO Re. 17,468
Original Filed Sept. 13, 1927
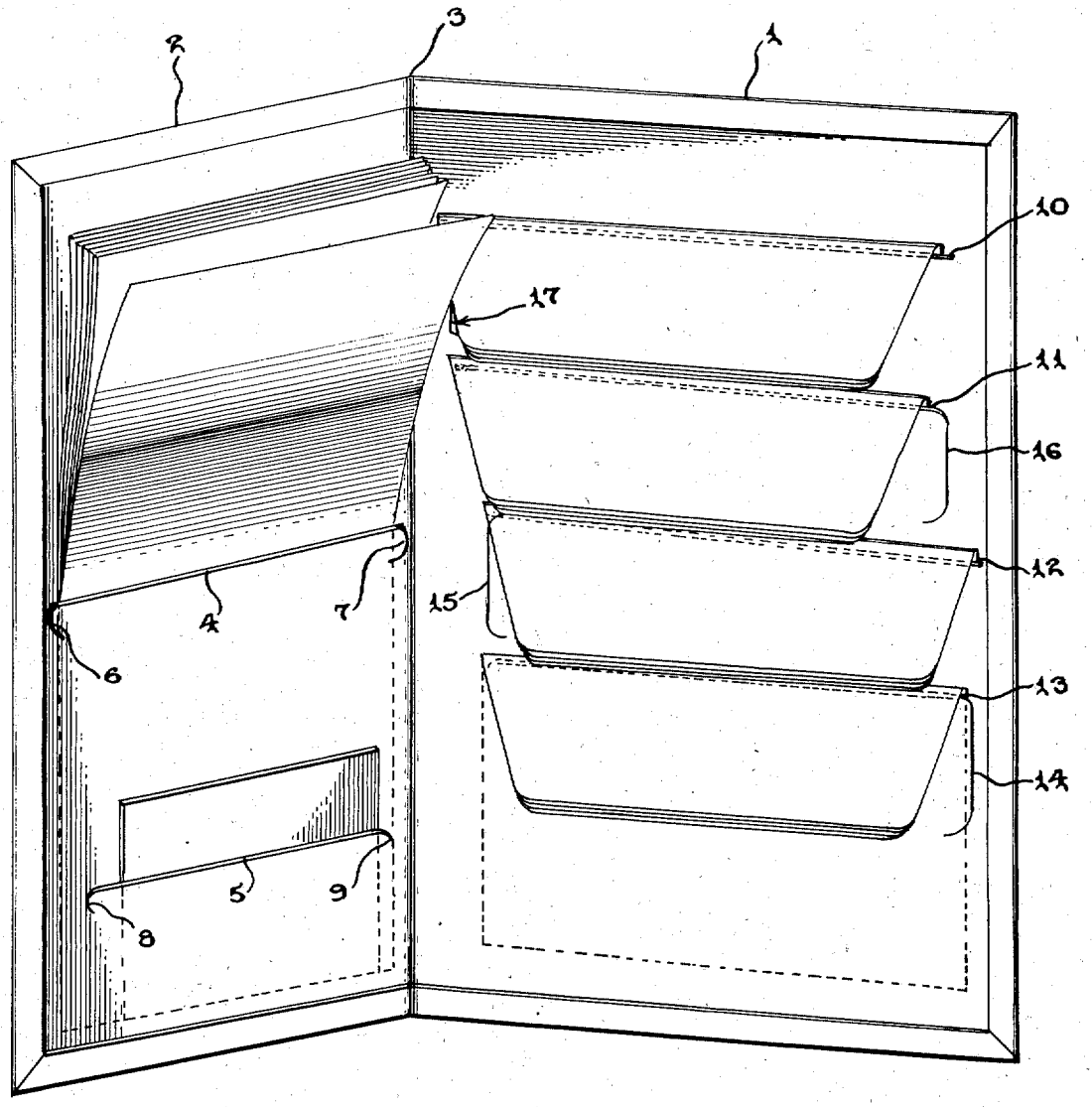
Inventor
Arthur E. Osborn
By Mason, Fenwick & Lawrence
Attorneys Reissued Oct. 22, 1929 Re. 17,468

UNITED STATES PATENT OFFICE

ARTHUR EDWARD OSBORN, OF MARION, INDIANA

PAPER PORTFOLIO

Original No. 1,663,171, dated March 20, 1928, Serial No. 219,291, filed September 13, 1927. Application for reissue filed December 5, 1928. Serial No. 324,021.

This invention relates to improvements in paper portfolios, particularly of the foldable type having pocket portions on the inside surfaces thereof.

An object of this invention is to provide a foldable paper portfolio having pocket openings therein for displaying envelopes, blotters and paper in a unique manner, thereby making the display feature a part of the writing portfolio, at the same time serving as a display feature.

A further object of this invention is to provide a combination writing pad or portfolio having included therein means for displaying elements such as envelopes, blotters and papers, the envelopes being arranged on one inside cover surface, one above the other in a novel and pleasing manner, at the same time providing means for easily placing and removing the writing elements from the portfolio pockets or receptacles.

Other objects of this invention will appear from the following detailed description of the device and as disclosed in the single sheet of drawings herewith made a part of this application.

In the drawings:

The single figure illustrates a perspective view of the paper portfolio disclosing the different elements such as writing paper, blotters and envelopes in position within the various pockets or receptacles connected with the inner surface of the portfolio.

The writing paper portfolio disclosed in the drawing comprises two portions 1 and 2 foldably connected to each other about the line 3. The portions 1 and 2 are preferably of comparatively stiff sheet paper folded about the line 3 as an axis of symmetry to form the said portions, which are of substantially the same dimensions and preferably rectangular.

A single sheet of material forms the inner layers of the portions 1 and 2, and is connected at its outer edges to the corresponding edges of a second sheet of material forming the outer layer of the portfolio. As shown in the drawing, the outer edges of the outer layer are folded over onto the face of the inner layer and are suitably secured to said inner layer.

The inner layer of the portion 2 is provided with a slit 4, substantially parallel to the top and bottom edges of the portfolio, and terminating at its opposite ends in arcuate slits 6 and 7, which form tabs adapted to be engaged by the fingers of the user in order to facilitate the separation of the edges of the slit 4 whenever it becomes necessary or desirable to insert writing paper through said slit 4 and into the pocket formed thereby between the inner and outer layers of the portfolio.

A second slit 5 is formed parallel to the slit 4 and terminates at its opposite ends in arcuate slits 8 and 9, similar to the slits 6 and 7 and serving the same purpose. The lower slit 5 is intended to receive one or more pieces of blotting paper having the upper parts thereof projecting through slit 5 and in front of the inner layer of portion 2 for display purposes.

The slits 4 and 5 are conveniently arranged on the portion 2 so that the writing paper may extend downwardly to the bottom of the pocket formed by slit 4 and the inner and outer layers of the portion 2. Similarly, the slit 5 is positioned so that the sheets of blotting paper inserted therethrough may rest on the bottom of the pocket between layers of portion 2.

The inner layer of the portion 1 is provided with a plurality of slits 10, 11, 12 and 13 parallel to each other, and subtantially parallel to the top and bottom edges of the portfolio. Each of these slits terminates at one end thereof in a slit substantially at right angles to the top and bottom edges of a portfolio. The slit 10 terminates at its inner end in the slit 17; the slit 11 terminates at its outer end in the slit 16; the slit 12 terminates at its inner end in the slit 15; and the slit 13 terminates at its outer end in the slit 14.

The slits 10, 11, 12 and 13 extend substantially the whole width of the inner layer of the portion 1, and the slits 17, 16, 15 and 14 are connected to alternate ends of the first named slits in order to maintain, as much as possible, the strength of the inner layer of the portion 1, and at the same time provide tabs which may be engaged by the fingers of the user to facilitate separation of the edges of the first named slit whenever it becomes necessary or desirable to insert envelopes therein.

The opposite ends of each of the slits 14, 15, 16 and 17 are slightly rounded to provide for convenient engagement by the fingers of the user.

The slits 10, 11, 12 and 13 on the portion 1 are intended to receive the bodies of envelopes in the pocket formed by said slits between the inner and outer layers of portion 1, with the flaps of the envelopes extending out from said pocket through said slits and into supported engagement by the edges thereof, in order to form a display support for said envelope.

This invention provides a writing paper portfolio including a feature of slitting the inside layers thereof so as to provide pockets for the purpose of making an attractive display of the paper, and envelopes. The particular form of slits and pocket receptacles makes it possible to arrange the elements in an exceedingly pleasing manner in the portfolio, particularly the slits and arrangement of the pockets for receiving the envelopes.

It is to be understood that alterations and substitutions may be made in the above disclosure within the scope of the claim without affecting the merits of the invention.

What I claim is:

A paper display portfolio including two substantially rectangular similar layers of material each having its edges only secured to the edges of the other, leaving the portions between said edges free of each other, one of said sheets being provided with a plurality of L-shaped slits, each of which has one leg thereof substantially parallel to the top and bottom edges of the portfolio and has its other leg extending at right angles to said top and bottom edges, all of the last named legs extending from the other legs in the same direction on said layer.

In testimony whereof I have signed my name to this application for reissue.

ARTHUR EDWARD OSBORN.